United States Patent
Curcio et al.

(10) Patent No.: US 10,108,818 B2
(45) Date of Patent: Oct. 23, 2018

(54) PRIVACY-AWARE QUERY MANAGEMENT SYSTEM

(71) Applicant: NEUSTAR, INC., San Francisco, CA (US)

(72) Inventors: Matthew Curcio, San Francisco, CA (US); Julie Hollek, San Francisco, CA (US); Steve Linde, San Francisco, CA (US)

(73) Assignee: Neustar, Inc., San Francisco, CA (US)

( * ) Notice: Subject to any disclaimer, the term of this patent is extended or adjusted under 35 U.S.C. 154(b) by 343 days.

(21) Appl. No.: 14/965,857

(22) Filed: Dec. 10, 2015

(65) Prior Publication Data

US 2017/0169253 A1    Jun. 15, 2017

(51) Int. Cl.
  *G06F 17/30* (2006.01)
  *G06F 21/62* (2013.01)

(52) U.S. Cl.
  CPC .... *G06F 21/6263* (2013.01); *G06F 17/30867* (2013.01); *G06F 21/6245* (2013.01); *G06F 21/6254* (2013.01)

(58) Field of Classification Search
  CPC ......... G06F 17/30867; G06F 17/30604; G06F 17/30979; G06F 7/582; G06F 17/30522; G06F 21/6263; G06F 21/6254; G06F 21/6245; G06F 21/6227; G06F 21/602; F06F 17/289; G06N 99/005; H04L 63/0421; H04W 12/02
  See application file for complete search history.

(56) References Cited

U.S. PATENT DOCUMENTS

| | | | |
|---|---|---|---|
| 8,375,030 B2* | 2/2013 | Rane | G06F 17/30539 707/736 |
| 2005/0075116 A1* | 4/2005 | Laird | A61B 5/04 455/456.3 |
| 2005/0168460 A1* | 8/2005 | Razdan | G06F 17/30398 707/E17.142 |

(Continued)

OTHER PUBLICATIONS

Lindell et al., "A Practical Application of Differential Privacy to Personalized Online Advertising", Department of Computer Science, Bar-Ilan University, Israel, pp. 1-19.

(Continued)

*Primary Examiner* — Anh Ly
(74) *Attorney, Agent, or Firm* — Mahamedi IP Law LLP

(57) ABSTRACT

A privacy-aware query management system receives a query to aggregate data from a number of datasets, wherein at least one of the datasets contains private information for one or more people. The privacy-aware query management system retrieves data from the datasets. Each of the plurality of datasets has associated privacy parameters that determine a level of noise to be applied to query results obtained from that dataset, and the levels of noise are used to determine an order of operations for the query to retrieve the data from the datasets. The privacy-aware query management system applies the levels of noise to each query result obtained from each of the datasets in accordance with the privacy parameters associated with that dataset, computes aggregated data from the query results with the levels of noise applied, and responds to the query with the aggregated data.

20 Claims, 5 Drawing Sheets

(56) References Cited

U.S. PATENT DOCUMENTS

| | | | | |
|---|---|---|---|---|
| 2006/0248592 A1* | 11/2006 | Agrawal | | G06F 17/30483 713/193 |
| 2007/0143289 A1* | 6/2007 | Dwork | | G06F 17/30477 707/E17.009 |
| 2009/0182797 A1* | 7/2009 | Dwork | | G06F 17/30539 707/E17.044 |
| 2009/0254971 A1* | 10/2009 | Herz | | G06Q 10/10 705/1.1 |
| 2011/0072003 A1* | 3/2011 | Boldyrev | | G06F 17/30427 707/713 |
| 2011/0078166 A1* | 3/2011 | Oliver | | G06F 17/30864 707/760 |
| 2012/0110680 A1* | 5/2012 | Oliver | | G06F 21/6245 726/30 |
| 2012/0143922 A1* | 6/2012 | Rane | | G06F 17/30539 707/803 |
| 2013/0212699 A1* | 8/2013 | Pollard | | G06F 21/6245 726/27 |
| 2014/0201126 A1* | 7/2014 | Zadeh | | G06K 9/627 706/52 |
| 2014/0281572 A1* | 9/2014 | Wang | | G06F 21/6254 713/189 |
| 2014/0283091 A1* | 9/2014 | Zhang | | G06F 21/60 726/26 |
| 2015/0193638 A1* | 7/2015 | Cook | | G06F 21/6245 726/27 |
| 2015/0286827 A1* | 10/2015 | Fawaz | | H04L 9/00 726/26 |
| 2016/0170996 A1* | 6/2016 | Frank | | G06F 17/30702 707/748 |

OTHER PUBLICATIONS

Dwork, "A Firm Foundation for Private Data Analysis", Microsoft Research, ACM, 8 pages.
Dwork, "Differential Privacy", Microsoft Research, pp. 1-12.
Sarathy et al., "Evaluating Laplace Noise Addition to Satisfy Differential Privacy for Numeric Data", Transactions on Data Privacy 4, 2011, pp. 1-17.
McSherry et al., "Privacy Integrated Queries", Microsoft Research, SIGMOD '09, Jun. 29-Jul. 2, 2009, ACM, 12 pages.
Cormode et al., "Differentially Private Spatial Decompositions", pp. 1-18.

* cited by examiner

Dataset A - 210

| ZIP | College | Email |
|---|---|---|
| 94107 | University of Arizona | joe@a.com |
| 94107 | UC Berkeley | bob@b.com |
| 94115 | USC | jon@c.com |
| 94115 | UCLA | bill@d.com |
| 94118 | Washington State | jose@e.com |
| 94122 | USC | jill@f.com |
| ... | ... | ... |

Dataset B - 220

| SSN | ZIP | Race |
|---|---|---|
| 006761799 | 94107 | White |
| 312900955 | 94124 | White |
| 420296686 | 94108 | Asian |
| 432068336 | 94112 | White |
| 488627603 | 94108 | Asian |
| 512187166 | 94115 | White |
| 516417718 | 94115 | White |
| 556225507 | 94118 | White |
| 574503908 | 94124 | Black |
| 577268959 | 94107 | White |
| 577486816 | 94124 | Asian |
| 648428099 | 94132 | White |
| 687033144 | 94111 | White |
| 764073411 | 94124 | Black |
| ... | ... | ... |

Dataset C - 230

| SSN | Income |
|---|---|
| 006761799 | $100,000 |
| 035308819 | $131,000 |
| 038100995 | $45,000 |
| 151500794 | $66,000 |
| 233338382 | $102,000 |
| 233663217 | $111,000 |
| 274302731 | $43,000 |
| 303214231 | $29,000 |
| 312900955 | $55,000 |
| 403627741 | $320,000 |
| 418135514 | $200,000 |
| 422407494 | $60,000 |
| 431196129 | $95,000 |
| 432068336 | $50,000 |
| 512187166 | $55,000 |
| 516417718 | $70,000 |
| 556225507 | $72,000 |
| 570755932 | $88,000 |
| 574503908 | $33,000 |
| 577486816 | $100,000 |
| 648428099 | $132,000 |
| 764073411 | $210,000 |
| ... | ... |

FIG. 2

PRIVACY-AWARE QUERY MANAGEMENT SYSTEM

TECHNICAL FIELD

Examples described herein relate to relational database management systems, and more specifically, to a privacy-aware query management system.

BACKGROUND

Vast quantities of individual information are currently collected and analyzed by a broad spectrum of organizations. While these data clearly hold great potential for analysis, they are commonly collected under the premise of privacy. Careless disclosures can cause harm to the data's subjects and jeopardize future access to such sensitive information.

Data disclosure horror stories about "anonymized" and "de-identified" data typically refer to non-interactive approaches in which certain kinds of information in each data record have been suppressed or altered. A famous example is America Online's release of a set of "anonymized" search query logs. People search for many obviously disclosive things, such as their full names, their own social security numbers (to see if their numbers are publicly available on the web, possibly with a goal of assessing the threat of identity theft), and even the combination of mother's maiden name and social security number. AOL carefully redacted such obviously disclosive "personally identifiable information" and replaced each user ID with a random string. However, search histories can be very idiosyncratic, and with the help of data from sources other than the AOL database, a New York Times reporter correctly connected one of the "anonymized" search histories to a specific resident of Georgia.

In these so-called linkage attacks, an attacker (sometimes called an adversary) links the "anonymized" data to auxiliary information found in other databases or other sources of information. Although each of these databases may be innocuous by itself, the combination of information can allow enough inferences to identify subjects in the "anonymized" data and thereby violate their privacy. Examples like the AOL database have shown that even with great care taken to anonymize statistical data, auxiliary information can defeat attempts to anonymize the data itself. This realization has led to interest in data analysis techniques, such as differential privacy, that can mathematically guarantee that the inclusion of a subject's sensitive data in a database does not discernably increase the likelihood of that sensitive data becoming public.

In database technology, a query plan (or query execution plan) is an ordered set of steps used to access data in a structured query language (SQL) relational database management system (RDMS). Query plans can also be thought of as a specific case of the relational model concept of access plans. Since SQL is declarative, there are typically a large number of alternative ways to execute a given query, although the alternatives can have widely varying performance. When a query is submitted to the database, a query optimizer evaluates some of the possible plans for executing the query and returns what it considers the "best" option under the given constraints. Typically, a query plan is designed to optimize computing resources available to a database server (e.g., processing power, memory, and bandwidth) and to execute a query as fast as possible.

BRIEF DESCRIPTION OF THE DRAWINGS

FIG. 2 illustrates example datasets containing private, personally identifiable information.

DETAILED DESCRIPTION

Figure 1:
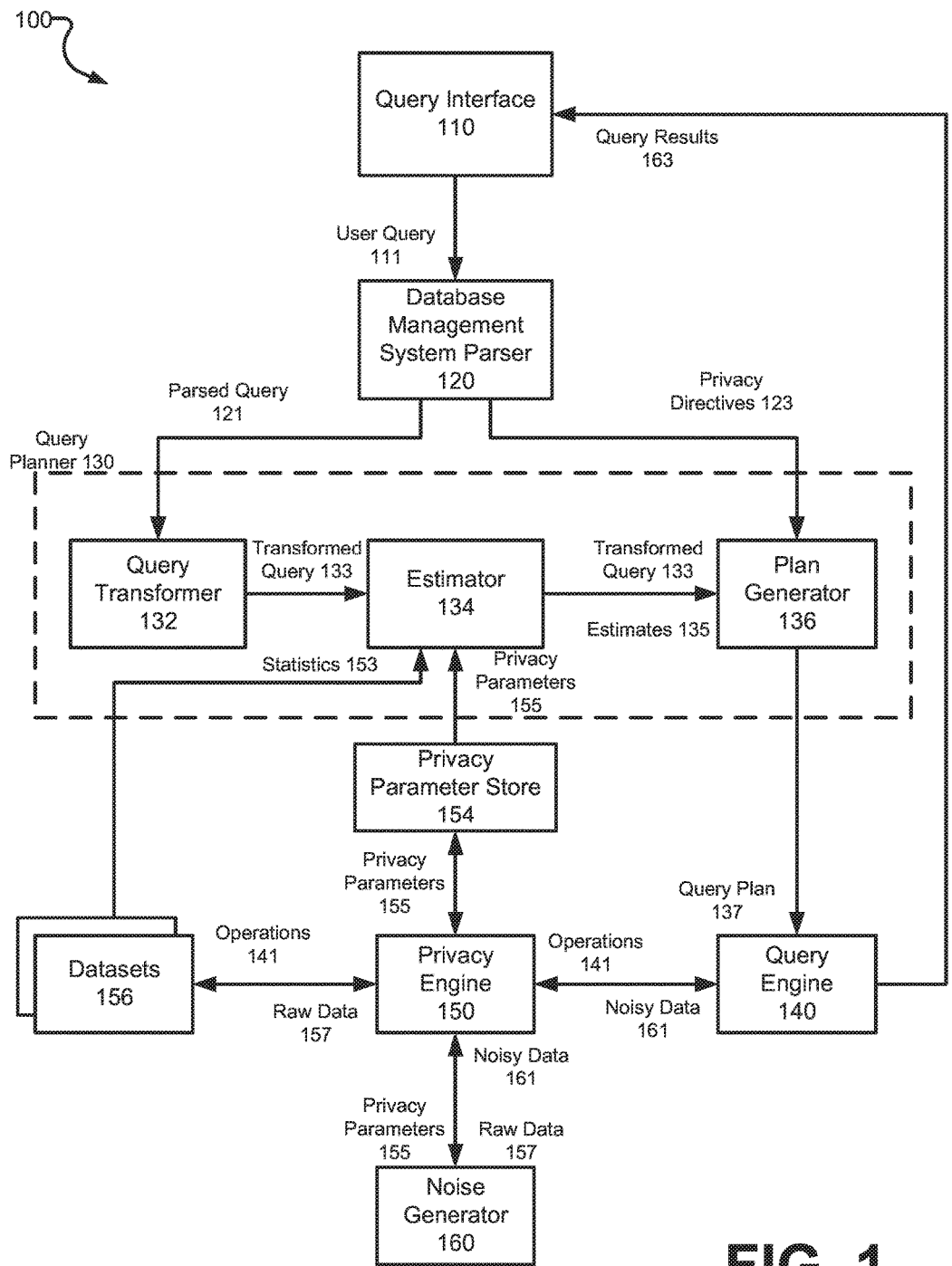
FIG. 1 illustrates an example privacy-aware query management system, in accordance with some aspects.

Entity resolution (ER) systems strive to identify individual things by joining together various disparate datasets using complex algorithms. When the things being identified are people, privacy becomes an important concern for the ER system. Joining together datasets increases the odds that individuals can be identified from the combined data, and people do not want any private information associated with them to become public. Therefore, many people may choose not to provide truthful information or any information if they believe their privacy could be jeopardized. To reassure people that providing personal data will not expose them to higher levels of privacy risk, an ER system can rely on a privacy-aware query management system that applies algorithms such as differential privacy.

Differential privacy is a privacy standard whereby, in the response to any query, including or excluding a particular observation is indistinguishable in a probabilistic sense. Unlike data releases where a database is "anonymized" and then published for anyone to query, differential privacy operates with the assumption that responses to queries are computed from the original data and the resulting output will then be altered to protect privacy (e.g., through added noise). With differential privacy, the owner of the database, or a trusted third party, maintains control of the original data and mathematically protects the privacy of individuals through limits placed on the size and number of queries allowed for the database. In other words, differential privacy requires that computations be formally indistinguishable when run with and without any one record, almost as if each participant had opted out of the data set.

This guarantee of privacy allows owners of sensitive databases to share their data with the query management system without inadvertently exposing anyone's identity. With this increased access to data, the query management system can intelligently combine databases to optimize both the quality of query results and the impact on privacy concerns. In addition, a query management system can safely perform many computations that reasonable privacy experts have previously considered dangerous: grouping by sensitive identifiers, joining protected tables, operating on binary data or text, integrating multiple data sets, and execution without whole program knowledge, among several others. These important features have long been anathema to privacy technology, but are now available with formal privacy guarantees.

However, in order to satisfy differential privacy guarantees, the number of queries and operations performed on the databases is necessarily limited. Otherwise, an adversary could run consecutive queries on the database to average out the noise added. Unfortunately, joining datasets can require a significant number of operations, which means that even single queries can exhaust the limited number that a database allows. So even though differential privacy guarantees allow the joining of disparate datasets, it is important to join them in the most efficient manner possible to preserve the limited number of operations, or privacy budget, available. In some aspects, a privacy-aware query management system can utilize a specialized query planner to preserve these privacy budgets.

In conventional database technology, the task of a query planner is to figure out an optimal algorithm, or "query plan," to carry out a query (e.g., a statement written in structured query language, or SQL). For simple queries against a single table with few indices, there is usually an obvious choice for the best algorithm. However, for larger and more complex queries, such as multi-way joins with many indices and subqueries, there can be hundreds or even thousands of reasonable algorithms for computing the result.

A query planner needs to make two important decisions regarding joins: the selection of a join order and the choice of a join algorithm. The selection of a join algorithm is the choice between a nested loops join, a merge join, or a hash join. Joins combine records from two tables based on some common information, but since a join works with only two tables at a time, a query requesting data from n tables must be executed as a sequence of n–1 joins. Although, in a conventional database system, the results of a query are the same regardless of the join order, the order in which the tables are joined greatly influences the cost and performance of a query. Therefore, a query planner's job is to find the optimal sequence of joins between the tables used in the query.

Unlike conventional query planners that optimize queries based on computing resources, a privacy-aware query management system optimizes queries for privacy parameters, such as privacy budget usage. Providers of the various datasets to the system can determine the privacy parameters based on the sensitivity of the data. For example, healthcare data is more sensitive than travel information, a social security number is more sensitive than a ZIP code, etc. Therefore, a healthcare database may have more restrictive privacy parameters, and a query planner can take those into account when optimizing a query so that accesses made to the healthcare database are minimized.

Since ER systems can compare and join data from many datasets using algorithms other than simple comparisons, queries from ER systems can result in a large number of database operations. Therefore, a privacy-aware query planner that optimizes the impact of queries on privacy budgets can benefit ER systems in particular.

According to one aspect, a privacy-aware query management system receives a query to aggregate data from a number of datasets, wherein at least one of the datasets contains private information for one or more people. The privacy-aware query management system retrieves data from the datasets. Each of the plurality of datasets has associated privacy parameters that determine a level of noise to be applied to query results obtained from that dataset, and the levels of noise are used to determine an order of operations for the query to retrieve the data from the datasets. The privacy-aware query management system applies the levels of noise to each query result obtained from each of the datasets in accordance with the privacy parameters associated with that dataset, computes aggregated data from the query results with the levels of noise applied, and responds to the query with the aggregated data.

In some aspects, the order of operations is a query plan constructed to minimize an overall level of noise applied to the aggregated data from the query results. The privacy-aware query management system receives a privacy directive along with the query and constructs the query plan to optimize the overall level of noise and satisfy the privacy directive.

In further aspects, the level of noise to be applied for each dataset increases based on each operation performed on that dataset. In addition, the privacy parameters associated with each dataset can include a separate set of privacy parameters for each field in that dataset, and the level of noise to be applied increases based on the separate set of privacy parameters for each field inspected by each operation. The privacy parameters can include a base level of a noise and a privacy budget for each dataset, both of which can be predetermined values chosen to protect privacy for the one or more people whose data is in the dataset.

One or more aspects described herein provide that methods, techniques and actions performed by a computing device are performed programmatically, or as a computer-implemented method. Programmatically means through the use of code, or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines.

Furthermore, one or more aspects described herein may be implemented through the use of instructions that are executable by one or more processors. These instructions may be carried on a computer-readable medium. Machines shown or described with figures below provide examples of processing resources and computer-readable media on which instructions for implementing some aspects can be carried and/or executed. In particular, the numerous machines shown in some examples include processor(s) and various forms of memory for holding data and instructions. Examples of computer-readable media include permanent memory storage devices, such as hard drives on personal computers or servers. Other examples of computer storage media include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable media.

Alternatively, one or more examples described herein may be implemented through the use of dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions. All the processing is performed by interconnected gates.

System Overview

FIG. 1 illustrates an example privacy-aware query management system 100, in accordance with some aspects. The privacy-aware query management system 100 includes a query interface 110, database management system (DBMS) parser 120, a query planner 130, query engine 140, privacy engine 150, and noise generator 160. In some aspects, query planner 130 can comprise a query transformer 132, estimator 134, and plan generator 136. In addition, query planner 130 and privacy engine 150 can access a privacy parameter store 154 and datasets 156 (i.e., database tables) to store and retrieve data. In other aspects, the privacy parameter store 154 and datasets 156 are stored together.

The privacy-aware query management system 100 provides interactive access to datasets 156, such as statistical databases containing sensitive information, and optimizes queries under differential privacy constraints in order to return useful data while protecting the privacy of the individuals whose data is in the datasets 156. These datasets 156 contain original data, including personally identifiable information, but queries to the datasets 156 made through the privacy-aware query management system 100 respect privacy parameters 155 calculated to minimize the privacy risk to individuals. The privacy-aware query management system 100 includes a query planner 130 that uses knowledge of each dataset 156, the query, and any privacy directives 123 submitted with the query to create a query plan 137 that maximizes the utility of the query results 163 while maintaining the differential privacy constraints imposed on the datasets 156. As a result, the privacy-aware query management system 100 can ensure that privacy concerns in identity or entity resolution systems are respected.

In some aspects, query interface 110 acts as an entry and exit point for input and output to the privacy-aware query management system 100. A user, such as a system administrator or customer with appropriate access permissions, can input a user query 111 through the query interface 110 in order to retrieve a set of query results 163 from the datasets 156. Query planner 130 generates a query plan 137 under the constraints of privacy parameters 155 that is designed to optimize the user query 111. In general, the query plan 137 can maximize the accuracy of query results 163, minimize the number of operations 141 performed on sensitive information, or a combination of both. Users can attach one or more privacy directives 123 to the user query 111 to choose and adjust the optimizations performed. Privacy engine 150 maintains and updates privacy parameters 155 and applies differentially private algorithms to raw data 157 retrieved from the datasets 156 in order to safeguard the sensitive information stored in datasets 156.

In some examples, query interface 110 represents a software interface that allows users to construct a user query 111 through the selection of operators and operands. Query interface 110 can include a graphical user interface (GUI) that displays information such as the names and fields of datasets 156 and their associated privacy parameters. In other examples, query interface 110 is a command line interface (CLI) or other interface that can accept a user query 111 directly from a user or from another software or hardware system, such as an entity resolution system. In addition, query interface 110 can authenticate users in order to control access to the datasets 156 and to apply the correct privacy parameters 155.

The role of database management system parser 120 is to take the user query 111 and convert it into a parsed query 121 that the query planner 130 can use to generate the query plan 137. In some implementations, DBMS parser 120 creates a set of query blocks that are nested or interrelated to each other, and query planner 130 rearranges these blocks to generate the query plan 137. DBMS parser 120 can also perform semantic validation based on a set of grammar rules to determine the validity of the user query 111.

Query planner 130 receives the parsed query 121 and generates a query plan 137 that optimizes an order of operations 141 under the constraints of privacy parameters 155. Query transformer 132 first analyzes the query blocks in parsed query 121 to determine if it is advantageous to change the form of the query so that it enables generation of a better query plan 137 (i.e., one that maximizes privacy or minimizes noise added to the results). Several different query transformation techniques can be employed by the query transformer 132, such as view merging, predicate pushing, or subquery unnesting. In the context of differential privacy, query transformer 132 can change the form of the query before any differentially-private aggregations take place. These changes can have the benefit of reducing the number of operations 141 to execute the query, which also results in more efficient use of the privacy budget and more accurate query results 163. For example, an inefficient query containing two redundant joins can be changed into a transformed query 133 that eliminates the redundancy.

Disparate databases compiled from different sources sometimes contain data entries that refer to the same person, place, or thing, except that the format of the entries does not match. For example, a person's address may be listed with "Apt. 10" in one database and "APT 10" in another. In order to better integrate databases, entity resolution and other types of identity systems can compare and join data using more complex algorithms than simple equality or matching comparisons. Therefore, query transformer 132 can also change operations 141 on a field to include common misspellings or typographical errors for that field.

Estimator 134 generates estimates 135 related to the transformed query 133 that the plan generator 136 can use to construct an optimal query plan 137. In some aspects, estimates 135 can include three broad types of measures: selectivity, cardinality, and cost. These measures are related to and derived from each other. The plan generator 136 can then use the estimates 135 to estimate the overall cost of a given plan. If statistics 153 are available to improve the degree of accuracy of estimates 135, then the estimator 134 uses them to compute the estimates 135. If no statistics 153 are available then the optimizer can either use dynamic sampling or internal default values.

The first measure, selectivity, represents a fraction of rows from a row set. The row set can be a base table, a view, or the result of a join or a GROUP BY operator. The selectivity is tied to a query predicate, such as last_name='Smith', or a combination of predicates, such as last_name='Smith' AND job_type='Clerk'. A predicate acts as a filter that filters a certain number of rows from a row set. Therefore, the selectivity of a predicate indicates how many rows from a row set will pass the predicate test. Selectivity lies in a value range from 0.0 to 1.0. A selectivity of 0.0 means that no rows will be selected from a row set, and a selectivity of 1.0 means that all rows will be selected.

When statistics 153 are available, the estimator 134 uses them to estimate selectivity. For example, for an equality predicate (last_name='Smith'), selectivity is set to the reciprocal of the number n of distinct values of last_name, because the query selects rows that all contain one out of n distinct values. If a histogram is available on the last_name column, then the estimator 134 uses it instead of the number of distinct values. The histogram captures the distribution of different values in a column so it yields better selectivity estimates. Having histograms on fields that contain skewed data (in other words, values with large variations in number of duplicates) can greatly help the estimator 134 generate good selectivity estimates 135.

Cardinality represents the number of rows in a row set. For example, the row set can be a base table, a view, or the result of a join or GROUP BY operator.

In conventional query planning, costs represent units of work or computing resources used, such as disk I/O, CPU usage, and memory usage. The cost used by the query planner 130 can therefore be an estimate of the number of disk I/Os, the amount of CPU cycles used, and the memory used in performing an operation. The operation can be scanning a table, accessing rows from a table by using an index, joining two tables together, sorting a row set, etc. Therefore, the cost of a query plan 137 is the number of work units that are expected to be incurred when the query is executed and its result produced.

Estimator 134 in privacy-aware query management system 100 uses privacy parameters 155 and a differential privacy analysis to create estimates 135 for queries performed on datasets 156. These estimates 135 can include a privacy cost function that plan generator 136 uses to optimize a query plan 137 for the transformed query 133. In some aspects, the owners or providers of each dataset 156 can furnish values for the privacy parameters 155 for that dataset 156. Privacy parameters 155 can include an epsilon ($\varepsilon$) value that represents an amount of noise added to the output of a query, a privacy budget, and one or more parameters indicating how many results are required for useful aggregate data or a magnitude of error deemed acceptable for queries on the data.

A single set of privacy parameters 155 can apply to an entire dataset 156 for all users of the privacy-aware query management system 100. Alternatively, separate users or user groups can have individual privacy parameters 155 that are not affected when another user or group queries the dataset 156. For example, one user may have a contractual agreement for access to a dataset 156 under the condition that he/she does not share or publicly disclose data retrieved from the dataset 156. Otherwise, users combining results of user queries 111 could potentially violate differential privacy guarantees.

In addition to the privacy parameters 155, estimator 134 can also calculate estimates 135 of computing resource costs for the transformed query 133 so that the query runs in an acceptable amount of time.

Under differential privacy, any given disclosure of private information is, within a small multiplicative factor, just as likely whether or not an individual participates in the database. As a consequence, there is a nominally increased risk to the individual in participating, and only nominal gain to be had by concealing or misrepresenting one's data. A disclosure can still occur, but the differential privacy guarantee assures the individual that it is not the presence of his or her data that causes it, nor could the disclosure be avoided through any action or inaction on the part of the user.

Formally, a randomized computation, or mechanism, M provides $\varepsilon$-differential privacy (epsilon-differential privacy) if for any two datasets A and B, and any set of possible outputs $S \subseteq \text{Range}(M)$, $$Pr[M(A) \in S] \leq Pr[M(B) \in S] \times \exp(\varepsilon \times |A \oplus B|).$$

Differential privacy relies only on the assumption that the datasets 156 are comprised of records, and therefore it can apply to queries for any types of data. In the case of count data and numeric data, the primary mechanism advanced for satisfying differential privacy is the addition of random noise generated through a normalized, continuous function, such as a Gaussian or Laplace distribution. For example, with count data, adding $1/\varepsilon$ Laplace noise results in a mechanism with $\varepsilon$-differential privacy.

A smaller value of epsilon yields a stronger privacy guarantee but also reduces the accuracy of the published statistics (since more Laplacian noise is added). Conversely, a larger epsilon yields more accurate results, but decreases the level of privacy. Owners or providers of each dataset 156 can provide an appropriate epsilon value depending on the sensitivity of the data and the amount of data necessary to obtain statistically significant information in aggregate. In some examples, separate epsilon values can be provided for each field in a dataset 156 in order to provide stronger privacy protection for more private data.

For any mechanism that satisfies differential privacy, since the privacy equality limits any adversary's knowledge gain, disclosure of individual private data is avoided. However, this assumption relies on a single query response and does not consider an adversary making multiple queries of a dataset 156 or pooling the result of a query with another adversary. When the adversary has information regarding (n−1) observations, he or she can use this information to issue a series of queries in order to estimate the value of the missing observation with a great deal of accuracy. In short, only the first query to a dataset 156 provides the desired level of privacy. All subsequent queries using epsilon to generate noise result in a reduction in privacy. For a general series of analyses with $\varepsilon_i$-differential privacy, the epsilon values are added together, providing $(\Sigma_i \varepsilon_i)$-differential privacy.

In some aspects, privacy parameters 155 include a privacy budget for each dataset 156 that acts as a total number of element accesses allowed for a dataset 156 that respect the dataset's privacy parameter $\varepsilon$ and also return statistically useful data. Query operations 141 can reduce the privacy parameter $\varepsilon$ for the dataset 156, thereby reducing the accuracy of results returned for queries on that dataset 156 and increasing privacy protections for individuals' data. Queries are allowed to access the dataset 156 until $\varepsilon$ is reduced below a predefined threshold that indicates further query operations 141 respecting $\varepsilon$-differential privacy would return data with significant enough noise added to render the results useless for statistical purposes. Once that predefined threshold is reached, the privacy budget for the dataset 156 is considered exhausted. Thus, in these aspects, the privacy budget for a dataset 156 is a function of $\varepsilon$ and the predetermined threshold for that dataset 156. For example, the provider of a dataset 156 with 10,000 names and corresponding amounts of money spent at a store determines that $\varepsilon=0.5$ is sufficient to protect individual privacy but any value of $\varepsilon<0.1$ results in statistically meaningless data.

In other aspects, each field, or column, of a dataset 156 has a separate privacy budget that is a function of $\varepsilon$ for that field. For example, in a dataset 156 with social security numbers and ZIP codes of individuals' residences, queries that access the ZIP code field but not the SSN field use the budget for the ZIP code field but have no impact on the separate budget for the SSN field.

When joining, a join cost represents the combination of the individual access costs of the two row sets being joined. When a query is made to join two datasets 156 together, the query planner 120 computes a total privacy budget and uses it to figure out how to effectively perform the query. In one example, the cost to the total privacy budget used for a query joining two datasets 156 is computed as the number of elements inspected in the first dataset 156 divided by its epsilon plus the number of elements in the second dataset 156 inspected divided by the second epsilon. This provides a cost function which plan generator 136 can optimize against. When fields have individual epsilon values, their epsilon values can be added together to provide a total epsilon for the cost function. In addition, a user query 111 can specify to randomly sample a certain number of elements in a dataset 156 or to fill a certain number of elements in the response with fake data. For example, a cost function for a transformed query 133 that joins table T with (SSN, ZIP) fields and table N with (SSN, Name) fields can be computed as:

$$((|T| \times [\text{fill or sample coefficient}])/(\varepsilon_{SSN} + \varepsilon_{ZIP})) + ((|N| \times [\text{fill or sample coefficient}])/(\varepsilon_{SSN} + \varepsilon_{Name})).$$

In some aspects, if the domain of input records is partitioned into disjoint sets, independent of the actual data, and the restrictions of the input data to each part are subjected to differentially-private analysis, the ultimate privacy guarantee depends only on the worst of the guarantees of each analysis, not the sum. Therefore, a sequence of analyses on structurally disjoint subsets of the data provides $(\max_i \varepsilon_i)$-differential privacy.

Whereas sequential composition is critical for any functional privacy platform, parallel composition is required to extract good performance from a privacy platform. Realistic analyses require aggregates and computation on different subpopulations. Although such operations can be analyzed as sequential composition, the privacy guarantee would scale with the number of subpopulations analyzed, using a large amount of a dataset's privacy budget. Leveraging parallel composition, the privacy costs are fixed, independent of the number of total queries, and thus permitting relatively thorough information at a modest privacy cost. In some examples, owners or providers of each dataset 156 can furnish a privacy parameter 155 indicating how many results are generally desired for the information retrieved to be thorough.

Once the estimates 135 are made, plan generator 136 can try out different possible plans for a transformed query 133 and pick the best, or optimal, query plan 137. For example, the best query plan 137 can be the plan that adds the least amount of noise to the raw data 157 and/or consumes the least amount of privacy budget for datasets 156. In some examples, plan generator 136 optimizes for a total privacy budget used across all queried datasets 156. In other examples, plan generator 136 can optimize for individual datasets 156, which can be weighted (e.g., by the importance of the data contained).

In addition to the transformed query 133 and estimates 135, plan generator 136 can receive privacy directives 123 from the user that instruct the plan generator 136 on which factors to optimize. For example, a privacy directive 123 can indicate that the user would like to spend all available privacy budgets to answer the user query 111 with the most accurate data possible. This can involve accessing as many rows as possible or performing redundant operations 141 and merging the results to counteract the added noise. Alternatively, the privacy directive 123 can specify a percentage of the total budget to use so that a user can leave budget available to make further queries on the same datasets 156. The privacy directives 123 therefore allow the plan generator 136 to make decisions about query execution that change both the intermediate execution as well as the privatization of the final results.

In some aspects, many different plans are possible because of the various combinations of different access paths, join methods, and join orders that can be used to access and process data in different ways and still produce the same raw data 157. However, in a differentially private system, each operation 141 to access datasets 156 incurs a persistent cost to the privacy budgets, and noise is added to the raw data 157 from each access based on the epsilon value. Therefore, two query plans that return the same query results 163 in a conventional query optimization system may not necessarily return the same results in privacy-aware query management system 100. Without a good query plan 137, a poorly constructed user query 111 could waste a large amount of privacy budget and return query results 163 containing data with significant amounts of noise.

The plan for a query can be established by generating subplans for each of the nested subqueries and unmerged views. Each nested subquery or unmerged view is represented by a separate query block, and the plan generator 136 can optimize the query blocks separately in a bottom-up order. That is, the innermost query block is optimized first, and a subplan is generated for it. The outermost query block, which represents the entire query, can be optimized last. The plan generator 136 can explore various plans for a query block by trying out different access paths, join methods, and join orders. For example, plan generator 136 can choose between a nested loop join, merge join, or hash join. The number of possible plans for a query block is proportional to the number of join items in the FROM clause, which rises exponentially with the number of join items.

The computer system performance of a query plan 137 is determined largely by the order in which the tables are joined. For example, when joining three tables A, B, C of size 10 rows, 10,000 rows, and 1,000,000 rows, respectively, a query plan 137 that joins B and C first can take several orders of magnitude more time to execute, perform far more operations 141, and thereby use more privacy budget and add more noise than a plan that joins A and C first. Therefore, it is important to order joins correctly, especially when many datasets 156 are being joined together. For example, if a query specifies only selecting women from a dataset 156 containing records for 1,000,000 people, joining this dataset 156 first can reduce the records joined to 500,000. On the other hand, if this dataset 156 is near the end of join order, then each record (potentially all 1,000,000) may be joined.

However, in some aspects, optimizing a query plan 137 for differential privacy can result in optimal joins that are suboptimal in terms of computing resources. For example, given datasets A and B, B may contain more sensitive data and therefore have a lower epsilon value than A. The plan generator 136 can then use estimates 135 to create a query plan 137 that joins A and B in a manner that limits the number of operations 141 and element accesses performed on dataset B even if dataset A is very large in comparison.

The plan generator 136 can use an internal cutoff to reduce the number of plans it tries when finding the one with the lowest cost. The cutoff is based on the cost of the current best plan. If the current best cost is large, then the plan generator tries harder (in other words, explores more alternate plans) to find a better plan with lower cost. If the current best cost is small, then the plan generator ends the search swiftly because further cost improvement is not likely to be significant.

In some aspects, plan generator 136 can also tighten or relax the sensitivity of join algorithms to similar entries, such as two slightly different versions of the same name or address. For example, plan generator 136 can disable such algorithms to conserve a privacy budget.

Query engine 140 executes the chosen query plan 137 to retrieve the requested data from the datasets 156 and return query results 163 to the query interface 110. In some examples, query engine 140 inspects the query blocks from the query plan 137 and converts SQL (or other database language) statements into operations 141 that are performed against the datasets 156. Query engine 140 is illustrated and described separately from the DBMS parser 120 and query planner 130 to highlight query planner 130 functionality; however, each of these components can be combined into a single query engine 140 component.

In some aspects, privacy engine 150 implements differential privacy and provides privacy guarantees for the datasets 156. Therefore, in order to execute operations 141 on the datasets 156, query engine 140 sends the operations 141 to privacy engine 150. Privacy engine 150 retrieves raw data 157 (e.g., row sets) from the datasets 156, returns noisy data 161 to the query engine 140, and manages privacy parameters 155 so that differential privacy is maintained.

Privacy engine 150 and datasets 156 can be physically located on a database server with the query engine 140, or alternatively, they can reside on separate hardware on the same or a different network. In some examples, owners or administrators of each of the datasets 156 can maintain control of the datasets 156 and only allow remote access through a trusted privacy engine 150. An owner of a dataset may be an online store with customer information, a governmental organization, a search engine, survey company, etc. that people trust to keep their data confidential. In other examples, an entity managing privacy engine 150 controls the datasets 156 with the understanding that privacy parameters 155 are respected. In either case, datasets 156 contain raw data 157 that has not been anonymized or perturbed. Therefore, a release of any raw data 157 containing sensitive information could violate the privacy of individuals who contributed the raw data 157 to datasets 156.

Privacy engine 150 takes the raw data 157 retrieved from each operation 141 and applies noise to the data so that the resulting noisy data 161 does not identify individuals who contributed data to the datasets 156. In some aspects, privacy engine 150 sends privacy parameters 155, including epsilon values and privacy budgets, to a noise generator 160 component.

The magnitude of random noise is chosen as a function of the largest change a single participant could have on the output to the query function, which is known as the sensitivity ($\Delta f$) of the function. For example, in a database of incomes where the highest income is $320,000, the sensitivity of a query function to calculate the sum of all incomes would be $320,000. If the query instead asked "how many people earn more than $100,000?" then the largest change a single participant can make on the resulting count is 1. It follows that the sensitivity is a property of the query function alone rather than being dependent on the entire database.

Applying a Laplace mechanism with noise ($\Delta f/\varepsilon$) maintains $\varepsilon$-differential privacy for numeric and count data. Functions that output other types of data, such as strings, can still maintain differential privacy guarantees, although not with controlled noise. Instead, a database administrator or owner of a given dataset 156 can provide a problem-dependent utility function, and/or noisy data 161 can be generated through techniques such as an exponential mechanism or posterior sampling. When join operations between datasets 156 are involved, noise generator 160 can add noise to key fields so that entries are incorrectly joined together at a rate that satisfies the privacy parameters 155 of the joined datasets 156.

In some examples, a user query 111 can request a certain number (e.g., 1000) rows of data from datasets 156 and also include a privacy directive 123 with the query to limit the amount of privacy budget expended. If the budget is not sufficient to maintain differential privacy guarantees and return the requested number of rows, noise generator 160 can create fake entries to add to the noisy data 161.

Due to a user's ability to combine data from multiple queries, subsequent queries using epsilon to generate noise result in a reduction in privacy. Therefore, in order to maintain $\varepsilon$-differential privacy for a given dataset 156, privacy engine 150 updates the privacy parameters 155, including epsilon and the privacy budget, for each operation 141 that accesses elements in that dataset 156. In some examples, privacy engine 150 reduces the epsilon value depending on the number of elements accessed, which results in more significant noise being added to raw data 157 for subsequent operations 141 and user queries 111 performed on that dataset 156.

Once the noise is added to the raw data 157, privacy engine 150 returns the noisy data 161 to the query engine 140, which can perform further operations 141 using the noisy data 161. After each of the operations 141 have been performed, query engine 140 aggregates and returns query results 163 to the query interface 110, which can display the results to a user or save them to a file, database, etc.

FIG. 2 illustrates three fictional datasets containing examples of private, personally identifiable information. Dataset A 210 is a table with three fields containing ZIP codes, a name of a college from which a resident of that ZIP code graduated, and an email address. Dataset B 220 is a table with three fields containing social security numbers, ZIP codes, and race for a database of individuals. Dataset C 230 is a table with two fields containing social security numbers and matching yearly incomes. Actual datasets would contain significantly more entries than illustrated, but it can be assumed for the sake of example that Dataset C 230 contains more entries than Dataset B 220 which contains more entries than Dataset A 210.

If a user query 111, presented to privacy-aware query management system 100 from FIG. 1, requests data linking colleges and incomes, a query engine 140 would need to join all three datasets. For example, an advertiser may want a list of email addresses for 1000 UCLA graduates who make at least $80,000 a year. However, the datasets contain sensitive information that, if combined with auxiliary information from other datasets, could expose an individual's SSN and exact income, among other data. Therefore, as a condition of making these datasets available to advertisers, a database owner or administrator may enforce differential privacy to protect individual privacy.

Differential privacy is a privacy standard whereby the response to any query, including or excluding a particular observation is indistinguishable in a probabilistic sense. Unlike data releases where a database is "anonymized" and then published for anyone to query, differential privacy operates with the assumption that responses to queries are computed from the original data and the resulting output will then be altered to protect privacy. With differential privacy, the owner of the database, or a trusted third party, maintains control of the original data and mathematically protects the privacy of individuals through limits placed on the size and number of queries allowed for the database. These limits are known as privacy budgets, and the more operations run against a dataset, the more of that dataset's privacy budget is consumed.

Since datasets can be joined in many different ways, a query optimizer, such as query planner 120, can construct a query plan that joins datasets A, B, and C together in an order that optimizes use of their privacy budgets. A conventional query optimizer typically starts with the most selective table and joins it with the next logical most selective table to minimize time and computer resources spent on the query. For example, a conventional query optimizer may choose to filter Dataset C 230 by income >$80,000 and then join the result to Dataset B 220. However, in privacy-aware query management system 100, query planner 120 optimizes the query based on privacy parameters. Depending on the privacy budgets available between the datasets, query planner 120 can, for example, join Dataset A 210 to Dataset B 220 first. Alternatively, query planner 120 can join Dataset B 220 to Dataset A 210.

After the query plan is constructed, the query engine 140 can execute the plan and return 1000 rows of data, with noise added to protect individual privacy, to the advertiser.

Figure 3:
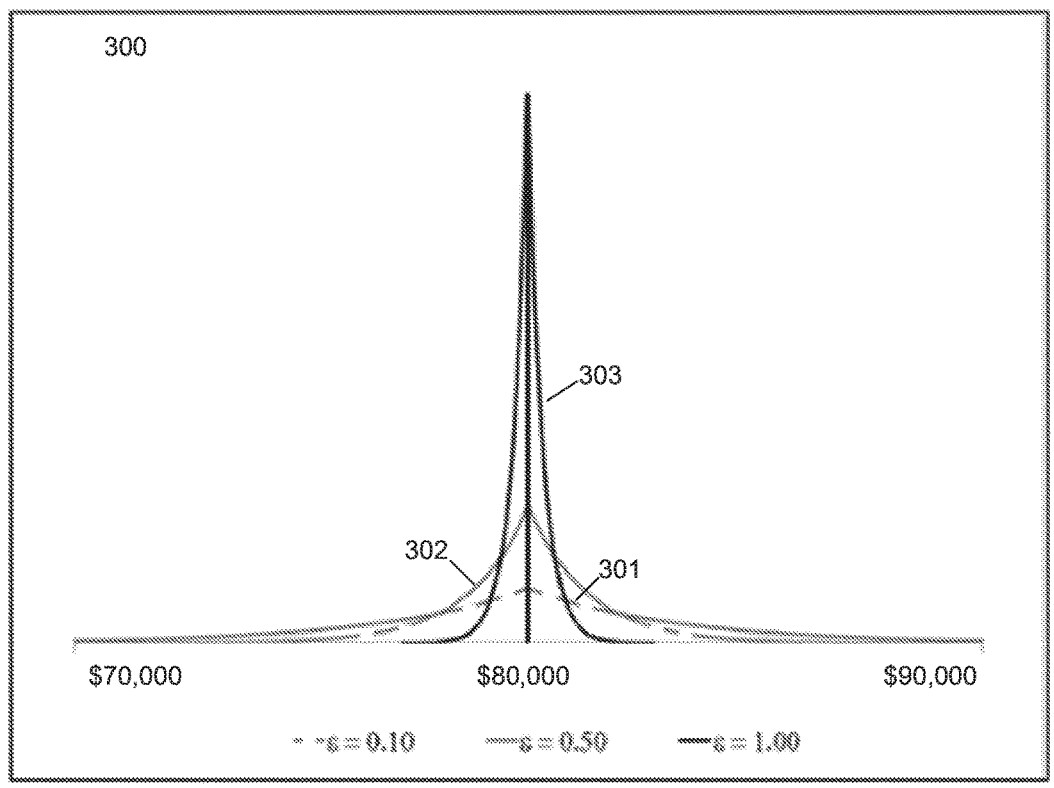
FIG. 3 illustrates example distributions of added random noise given different privacy parameters.

FIG. 3 illustrates example distributions of added random noise given different privacy parameters. The three distributions 301, 302, and 303 represent the likelihood of results, using three different epsilon values in a Laplace distribution to add noise, from a query asking for the mean yearly income of a dataset. The actual mean yearly income of the raw data in the dataset is $80,000.

Distribution 301 graphs a distribution of the query results where the dataset is protected by 0.10-differential privacy ($\varepsilon=0.10$). In differential privacy, lower values of epsilon add more noise and therefore offer greater degrees of privacy protection. Although the probable results of the query are still likely to be near the actual mean, it is also possible that +/−$10,000 of noise is added.

Distribution 303 graphs a distribution of the query result where the dataset is protected by 1.00-differential privacy ($\varepsilon=1.00$). Higher values of epsilon add less noise and therefore offer lesser degrees of privacy protection. With this relaxed privacy parameter, the probable results of the query are likely to be accurate within $1,000 with even the worst case scenario still within a few percentage points of error.

Distribution 302 graphs a distribution of the query result where the dataset is protected by 0.50-differential privacy ($\varepsilon=0.50$). Unsurprisingly, this distribution falls between 0.10 and 1.00.

Each of the distributions 301, 302, and 303 are symmetric about the real average, which is important because a distribution that only yields non-negative noise would be problematic. For example, the only databases on which a counting query could return a response of 0 would be databases in which no row satisfies the query.

In a differential privacy system such as privacy-aware query management system 100, the epsilon value is decreased as more queries or query operations are run against a dataset. For example, the dataset of FIG. 3 may be given an epsilon of 1.00, but in order to ensure that $\varepsilon$-differential privacy is maintained across multiple queries, epsilon is reduced and additional noise is added to subsequent queries. This can result in a second query returning results using a Laplacian distribution with $\varepsilon=0.50$ and a third query using $\varepsilon=0.10$. After enough queries, a query for the mean income of the dataset can result in such a large amount of noise that it can return worthless, nonsensical values such as negative numbers. In some aspects, a privacy budget is set as a threshold $\varepsilon$ value where the database owner believes results from the dataset are no longer worthwhile.

Methodology

Figure 4:
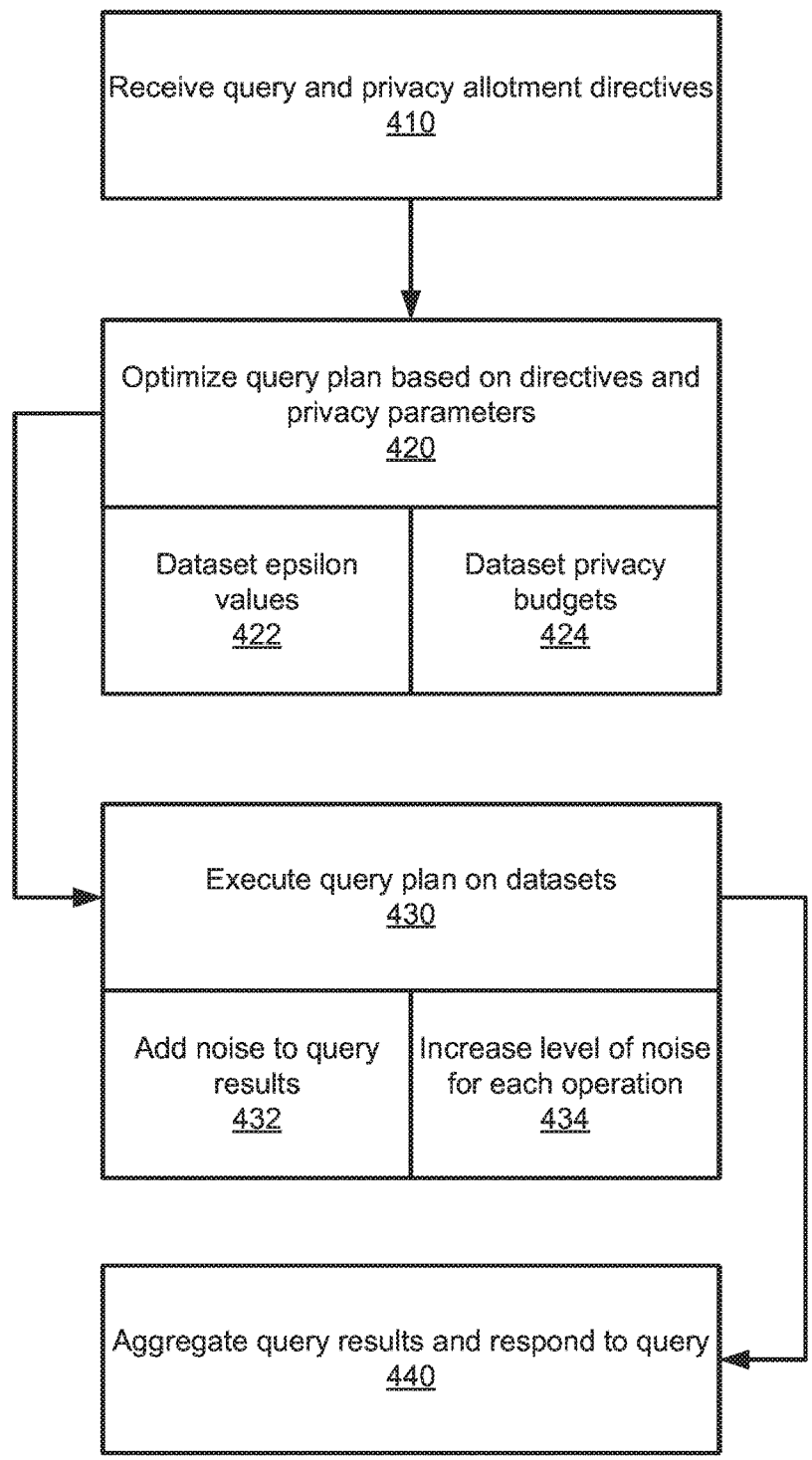
FIG. 4 illustrates an example method for privacy-aware query management, in accordance with some aspects.

FIG. 4 illustrates a method for privacy-aware query management, according to an aspect. While operations of the method are described below as being performed by specific components, modules or systems of the privacy-aware query management system 100, it will be appreciated that these operations need not necessarily be performed by the specific components identified, and could be performed by a variety of components and modules, potentially distributed over a number of machines. Accordingly, references may be made to elements of system 100 for the purpose of illustrating suitable components or elements for performing a step or sub step being described. Alternatively, at least certain ones of the variety of components and modules described in privacy-aware query management system 100 can be arranged within a single hardware, software, or firmware component. It will also be appreciated that some of the steps of this method may be performed in parallel or in a different order than illustrated.

With reference to an example of FIG. 4, a privacy-aware query management system 100, as described with FIG. 1, can receive a query and privacy allotment directives through a query interface 110 (410). Based on the privacy directives received and privacy parameters associated with the datasets the query accesses, a query planner 120 chooses an optimal query plan to meet the privacy directives, minimize the impact of the query on privacy budgets, and/or minimize an amount of noise added to query results (420).

Estimator 134 generates estimates 135 related to the query that the plan generator 136 can use to construct an optimal query plan 137. Estimator 134 in privacy-aware query management system 100 uses privacy parameters 155 and a differential privacy analysis to create estimates 135 for queries performed on datasets 156. These estimates 135 can include a privacy cost function that plan generator 136 uses to optimize a query plan 137 for the query. In some aspects, the owners or providers of each dataset 156 can furnish values for the privacy parameters 155 for that dataset 156. Privacy parameters 155 can include an epsilon ($\varepsilon$) value that represents an amount of noise added to the output of a query, a privacy budget, and one or more parameters indicating how many results are required for useful aggregate data or a magnitude of error deemed acceptable for queries on the data (422). In some aspects, the privacy budget for each dataset 156 acts as a total number of element accesses allowed for a dataset 156 that respect the dataset's privacy parameter $\varepsilon$ and also return statistically useful data (424).

Once the query plan is chosen, query engine 140 executes the query plan on the datasets to retrieve the requested data from the datasets 156 and return query results 163 to the query interface 110 (430). In some aspects, privacy engine 150 implements differential privacy and provides privacy guarantees for the datasets 156. Therefore, in order to execute operations 141 on the datasets 156, query engine 140 sends the operations 141 to privacy engine 150. Privacy engine 150 retrieves raw data 157 from the datasets 156, returns noisy data 161 to the query engine 140, and manages privacy parameters 155 so that differential privacy is maintained.

Privacy engine 150 takes the raw data 157 retrieved from each operation 141 and applies noise to the data so that the resulting noisy data 161 does not identify individuals who contributed data to the datasets 156 (432). Due to a user's ability to combine data from multiple queries, subsequent queries using epsilon to generate noise result in a reduction in privacy. Therefore, in order to maintain ε-differential privacy for a given dataset 156, privacy engine 150 updates the privacy parameters 155, including epsilon and the privacy budget, for each operation 141 that accesses elements in that dataset 156. In some examples, privacy engine 150 reduces the epsilon value depending on the number of elements accessed, which results in more significant noise being added to raw data 157 for subsequent operations 141 and user queries 111 performed on that dataset 156 (434).

Once the noise is added to the raw data 157, privacy engine 150 returns the noisy data 161 to the query engine 140, which can perform further operations 141 using the noisy data 161. After each of the operations 141 have been performed, query engine 140 aggregates and returns query results 163 to the query interface 110, which can display the results to a user or save them to a file, database, etc. (440).

Computer System

Figure 5:
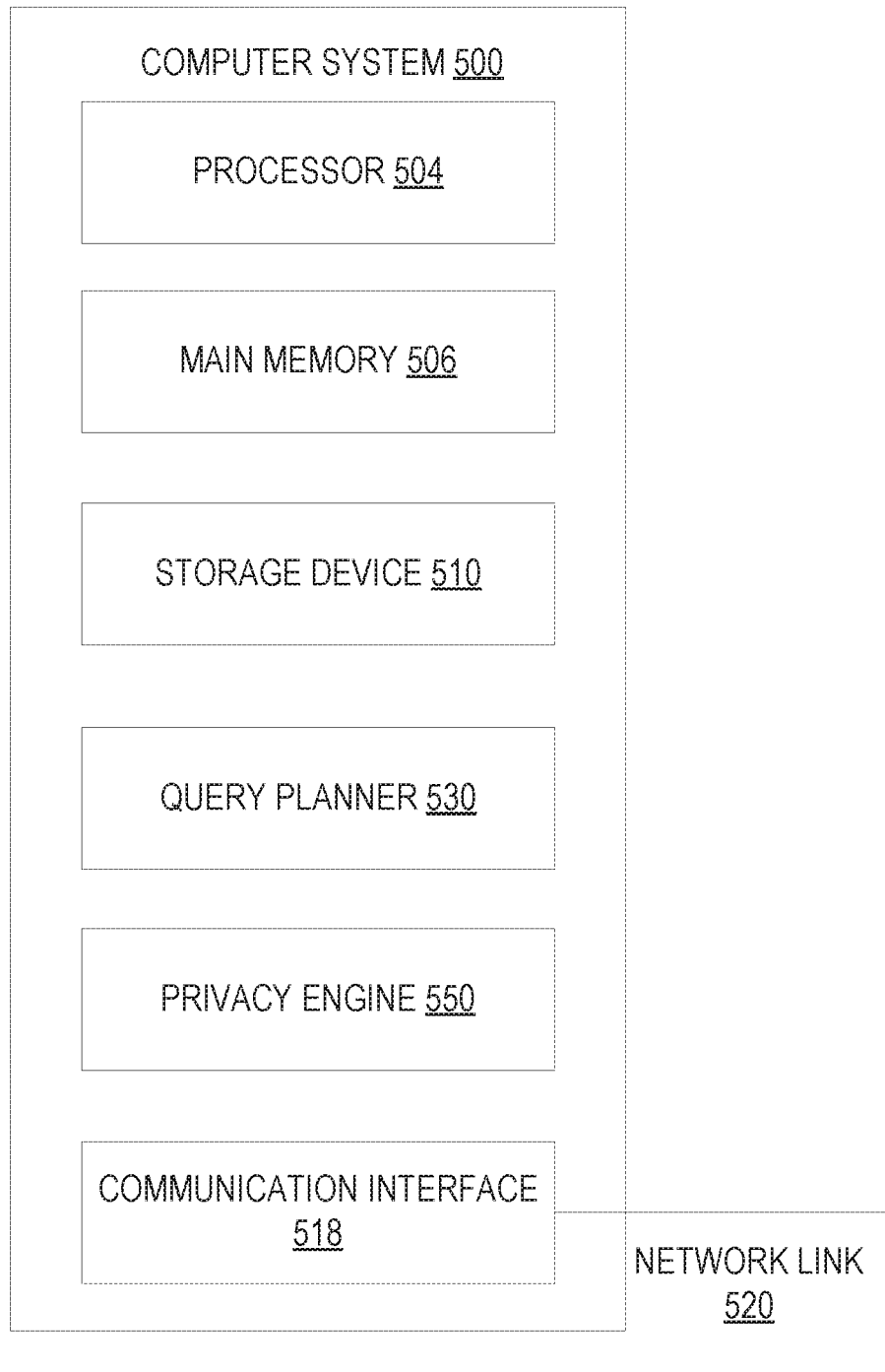
FIG. 5 is a block diagram that illustrates a computer system upon which aspects described herein may be implemented.

FIG. 5 is a block diagram that illustrates a computer system upon which aspects described herein may be implemented. For example, in the context of FIG. 1, privacy-aware query management system 100 may be implemented using one or more computing devices such as described by FIG. 5.

In an aspect, computer system 500 includes processor 504, memory 506 (including non-transitory memory), storage device 510, and communication interface 518. Computer system 500 includes at least one processor 504 for processing information. Computer system 500 also includes the main memory 506, such as a random access memory (RAM) or other dynamic storage device, for storing information and instructions to be executed by processor 504. Main memory 506 also may be used for storing temporary variables or other intermediate information during execution of instructions to be executed by processor 504. Computer system 500 may also include a read only memory (ROM) or other static storage device for storing static information and instructions for processor 504. The storage device 510, such as a magnetic disk or optical disk, is provided for storing information and instructions. Computer system 500 may also include a query planner 530 and privacy engine 550 for performing aspects of privacy-aware query management system 100. The communication interface 518 may enable the computer system 500 to communicate with one or more networks through use of the network link 520 and any one of a number of well-known transfer protocols (e.g., Hypertext Transfer Protocol (HTTP)). Examples of networks include a local area network (LAN), a wide area network (WAN), the Internet, mobile telephone networks, Plain Old Telephone Service (POTS) networks, and wireless data networks (e.g., WiFi and WiMax networks).

Examples described herein are related to the use of computer system 500 for implementing the techniques described herein. According to one aspect, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative aspects, hardwired circuitry may be used in place of or in combination with software instructions to implement aspects described herein. Thus, aspects described are not limited to any specific combination of hardware circuitry and software.

Although illustrative aspects have been described in detail herein with reference to the accompanying drawings, variations to specific examples and details are encompassed by this disclosure. It is intended that the scope of examples described herein be defined by claims and their equivalents. Furthermore, it is contemplated that a particular feature described, either individually or as part of an aspect, can be combined with other individually described features, or parts of other aspects. Thus, absence of describing combinations should not preclude the inventor(s) from claiming rights to such combinations.

What is claimed is:

1. A method of query optimization, the method being implemented by one or more processors and comprising:
   receiving a query to aggregate data from a plurality of datasets, wherein at least one of the plurality of datasets contains private information for one or more people;
   retrieving data from the plurality of datasets, each of the plurality of datasets having associated privacy parameters that determine a level of noise to be applied to query results obtained from that dataseta;
   applying the levels of noise to each query result obtained from each of the plurality of datasets in accordance with the privacy parameters associated with that dataset, the query results being obtained in accordance with an order of database operations determined by the levels of noise;
   computing aggregated data from the query results with the levels of noise applied; and
   responding to the query with the aggregated data.

2. The method of claim 1, wherein the order of database operations comprises a query plan constructed to minimize an overall level of noise applied to the aggregated data from the query results.

3. The method of claim 2, further comprising:
   receiving a privacy directive along with the query; and
   constructing the query plan to optimize the overall level of noise and satisfy the privacy directive.

4. The method of claim 1, wherein the level of noise to be applied for each dataset increases based on each operation performed on that dataset.

5. The method of claim 1, wherein the privacy parameters associated with each dataset include a separate set of privacy parameters for each field in that dataset, and the level of noise to be applied increases based on the separate set of privacy parameters for each field inspected by each operation.

6. The method of claim 1, wherein the privacy parameters include a base level of noise and a privacy budget.

7. The method of claim 6, wherein the base levels of noise and privacy budgets for each dataset are predetermined values chosen to protect privacy for the one or more people.

8. A query optimization system comprising:
   a memory resource to store instructions;
   one or more processors using the instructions stored in the memory resource to:
      receive a query to aggregate data from a plurality of datasets, wherein at least one of the plurality of datasets contains private information for one or more people;
      construct a query plan to retrieve data from the plurality of datasets, each of the plurality of datasets having associated privacy parameters that determine a level of noise to be applied to query results obtained from that dataset;
      in response to executing the query plan on the plurality of datasets, apply the levels of noise to each query result obtained from each of the plurality of datasets in accordance with the privacy parameters associated with that dataset, the query results being obtained in accordance with an order of database operations determined by the levels of noise;

compute aggregated data from the query results with the levels of noise applied; and respond to the query with the aggregated data.

9. The system of claim 8, wherein constructing the query plan to optimize application of the levels of noise includes minimizing an overall level of noise applied to the aggregated data from the query results.

10. The system of claim 8, further comprising instructions used by the one or more processors to:

receive a privacy directive along with the query; and construct the query plan to optimize the level of noise and satisfy the privacy directive.

11. The system of claim 8, wherein the level of noise to be applied for each dataset increases based on each operation performed on that dataset.

12. The system of claim 8, wherein the privacy parameters associated with each dataset include a separate set of privacy parameters for each field in that dataset, and the level of noise to be applied increases based on the separate set of privacy parameters for each field inspected by each operation.

13. The system of claim 8, wherein the privacy parameters include a base level of noise and a privacy budget.

14. The system of claim 13, wherein the base levels of noise and privacy budgets for each dataset are predetermined values chosen to protect privacy for the one or more people.

15. A non-transitory computer-readable medium that stores instructions, executable by one or more processors, to cause the one or more processors to:

receive a query to aggregate data from a plurality of datasets, wherein at least one of the plurality of datasets contains private information for one or more people;

construct a query plan to retrieve data from the plurality of datasets, each of the plurality of datasets having associated privacy parameters that determine a level of noise to be applied to query results obtained from that dataset;

in response to executing the query plan on the plurality of datasets, apply the levels of noise to each query result obtained from each of the plurality of datasets in accordance with the privacy parameters associated with that dataset, the query results being obtained in accordance with an order of database operations determined by the levels of noise;

compute aggregated data from the query results with the levels of noise applied; and respond to the query with the aggregated data.

16. The non-transitory computer-readable medium of claim 15, wherein constructing the query plan to optimize application of the levels of noise includes minimizing an overall level of noise applied to the aggregated data from the query results.

17. The non-transitory computer-readable medium of claim 15, further comprising instructions used by the one or more processors to:

receive a privacy directive along with the query; and construct the query plan to optimize the level of noise and satisfy the privacy directive.

18. The non-transitory computer-readable medium of claim 15, wherein the level of noise to be applied for each dataset increases based on each operation performed on that dataset.

19. The non-transitory computer-readable medium of claim 15, wherein the privacy parameters associated with each dataset include a separate set of privacy parameters for each field in that dataset, and the level of noise to be applied increases based on the separate set of privacy parameters for each field inspected by each operation.

20. The non-transitory computer-readable medium of claim 15, wherein the privacy parameters include a base level of noise and a privacy budget.

\* \* \* \* \*